No. 871,764. PATENTED NOV. 19, 1907.
E. J. MONEUSE.
COOKING STOVE OR RANGE.
APPLICATION FILED JAN. 30, 1907.
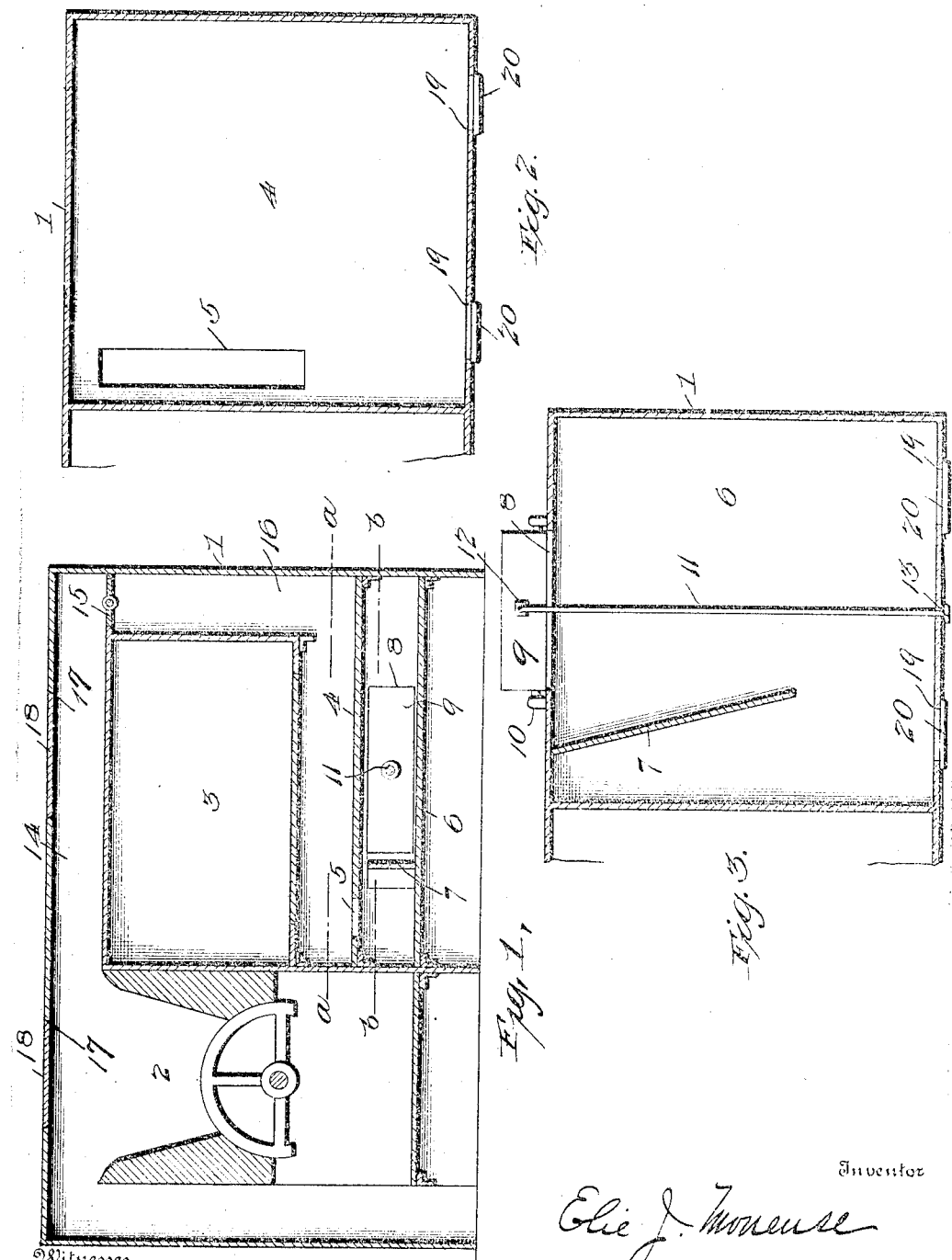

UNITED STATES PATENT OFFICE.

ELIE J. MONEUSE, OF NEW YORK, N. Y., ASSIGNOR OF ONE-FOURTH TO HENRY HAMMOND, OF WASHINGTON, DISTRICT OF COLUMBIA.

COOKING STOVE OR RANGE.

No. 871,764.　　　　　Specification of Letters Patent.　　　Patented Nov. 19, 1907.

Application filed January 30, 1907. Serial No. 354,886.

*To all whom it may concern:*

Be it known that I, ELIE J. MONEUSE, a citizen of the United States, residing at New York, in the county of New York and State of New York, have invented certain new and useful Improvements in Cooking Stoves or Ranges, of which the following is a specification.

The invention relates to cooking-stoves or ranges; and it consists of a novel arrangement of heat-conducting flues, whereby the circulation of heat is so conducted and retarded, especially beneath the oven, that the heat will be retained in the flues a much longer period of time than is usual in this type of stove, thus insuring a greater heating capacity for the oven, and thereby a better and quicker baking quality.

My arrangement of flues is not only advantageous in the larger stoves or ranges, such as are used in hotels, clubs, etc., but is equally desirable in the smaller stoves or ranges, where it is not required or found necessary to maintain an exceedingly hot fire at all times, as where the economy desirable, incident to domestic use, would be a consideration.

I have not considered it necessary to show, in the drawing, an oven on each side of the fire-box, but it will be understood, and it will be obvious, that the construction hereinafter described may be duplicated in so far as the oven and the arrangement of flues and dampers are concerned.

In the drawing—Figure 1 is a longitudinal section of a stove or range constructed in accordance with my invention; Fig. 2, a horizontal section on line $a\,a$ of Fig. 1, showing the plate immediately below the oven, and Fig. 3 a similar view taken on line $b\,b$ of Fig. 1, showing the arrangement of the deflector or baffle-plate for directing and retarding the flow of heat.

Referring to the several views, the numeral 1 indicates the casing of the stove; 2 the fire-box, and 3 the oven. These several parts may be of the usual or any approved construction, and the casing may be ornamented in the customary manner.

Situated below the oven is a horizontal plate 4, which divides the space, between the bottom of the oven and the plate 6, into an upper and lower flue, communication being had by means of an elongated opening 5 in said plate.

Extending from the rear wall of the casing is a deflector or baffle-plate 7, which extends, preferably, a slight distance beyond the center of the plate 6, and in a slightly diverging line, so that the flow of heat, as it passes through the opening 5, will be directed toward the center of the lower flue, said opening being so positioned that the flow of heat, after passing under the oven, will pass through the opening nearer to the back of the oven, from whence it will be deflected or directed, by the deflector, to the center and every part of said lower flue, at the same time being retarded in its passage therethrough.

The lower flue, at the back of the casing, is provided with an exit 8, which is controlled by a damper 9 pivoted to the back of the casing at 10. The damper is operated by a rod 11, which is pivotally-connected to the damper at 12, and, extending to the front of the stove, is provided with a knob 13.

The passage of the products of combustion and the flow of heat, around the oven and through the flues, are controlled or regulated by a damper 15, located between the flues 14 and 16.

The top of the stove or range is provided with the usual openings 17 and covers 18, and the walls of the upper and lower flues are provided with openings 19, normally closed by doors 20, so that said flues may be cleaned when desired.

In the operation of the stove, the draft is established by opening dampers 15 and 9. The products of combustion will pass over the top of the oven, through the open damper 15 into flue 16; thence through the upper flue beneath the oven and down through opening 5 into the lower flue, from whence they will be drawn into the exit-flue (not shown) through the exit-opening 8, it being understood that there is sufficient draft in the smoke-stack or chimney to draw the products of combustion down around the oven and through the exit-opening. After the draft is established and it is desired to heat the oven, the damper 9 may be closed, and the degree of heat regulated by the damper 15; the obnoxious gases passing out through damper 9, which may be of the usual construction.

Having thus fully described my invention what I claim, is—

1. In a cooking-stove or range, the combination with the oven, spaced from the bottom of the stove or range to form a heat-space below the oven, a horizontal division-plate dividing said heat-space into two longitudinal flues, one above the other, said division-plate being provided with an elongated opening extending transversely thereof, from near its rear edge and near the fire-box, and a retarder or baffle-plate, in the lower flue extending from the rear of the stove.

2. In a cooking-stove or range, the combination with the oven, spaced from the bottom of the stove to form a heat-space below the oven, a horizontal division-plate dividing said heat-space into two longitudinal flues, one above the other, said division-plate being provided with an elongated opening extending transversely thereof from near its rear edge and near the fire-box, a retarder or baffle-plate arranged in the lower flue to extend from the rear of the stove, and dampers for controlling and regulating the flow of heat through the flues, and around the oven.

In testimony whereof I have signed my name to this specification in the presence of two subscribing witnesses.

ELIE J. MONEUSE.

Witnesses:
 H. L. CASEY,
 HERMAN VUILLE.